United States Patent [19]

Angelino

[11] Patent Number: 5,288,398
[45] Date of Patent: Feb. 22, 1994

[54] FILTER BED BACKWASHING DEVICES AND METHODS

[75] Inventor: Stephen P. Angelino, Midlothian, Va.

[73] Assignee: Infilco Degremont Inc., Richmond, Va.

[21] Appl. No.: 25,130

[22] Filed: Mar. 2, 1993

[51] Int. Cl.⁵ .......................................... B01D 24/46
[52] U.S. Cl. ................................... 210/89; 210/96.1; 210/108; 210/138; 210/143; 210/275; 210/411; 210/739; 210/745; 210/793; 210/85
[58] Field of Search .................... 210/85, 88, 89, 96.1, 210/98, 106, 108, 138, 142, 143, 275, 411, 791-793, 739, 745

[56] References Cited

U.S. PATENT DOCUMENTS

| | | | |
|---|---|---|---|
| 3,239,061 | 3/1966 | Horning et al. | 210/793 |
| 4,133,766 | 1/1979 | Adie | 210/275 |
| 4,617,131 | 10/1986 | Walker | 210/794 |
| 4,764,288 | 8/1988 | Walker et al. | 210/793 |
| 5,089,117 | 2/1992 | Nichols | 210/93 |
| 5,147,560 | 9/1992 | Nichols | 210/745 |

*Primary Examiner*—Neil M. McCarthy
*Attorney, Agent, or Firm*—Carroll F. Palmer

[57] ABSTRACT

Methods and systems of the prior art for cleansing a plurality of seriate filter cells in automatic backwash filters by backwashing the cells one at a time with backwash liquid wherein the cleansing operation on the active cell is prevented from moving to a further cell until the contaminant content of the waste liquid issuing from the previous cell reaches a predetermined low level are improved by overriding such prevention even though such content remains too high when a prescribed quantity of waste liquid has issued from the previous cell, e.g., as determined by a timer or fluid meter.

10 Claims, 1 Drawing Sheet

FILTER BED BACKWASHING DEVICES AND METHODS

BACKGROUND OF THE INVENTION

1. Field of the Invention

This application relates broadly to improvements in automatic backwash filtering systems. More particularly, it concerns improved devices and methods for control of backwash operations in such systems.

2. Description of the Prior Art

Automatic backwash filter systems are known in the art as exemplified in U.S. Pat. Nos. 3,239,061; 4,133,766; 4,617,131; 4,764,288; 5,089,117 and 5,147,560 currently assigned to Infilco Degremont Inc., the assignee of the invention disclosed herein. The disclosures of these patents are incorporated herein by reference.

A principal use of automatic backwash filter systems is to produce potable water in water treatment plants many of which are subject to state or other governmental regulatory agencies that set standards and conditions concerning the operation of the systems and the quality of the effluent. For example, many such agencies require that, following backwash in filter beds of a potable water treatment plant, the effluent from such filter beds can not be placed back on the service line, but must be sent to waste, until their contaminant content reaches a predetermined acceptable low level, e.g., a turbidity of <0.25 NTU. When this contaminant content level is reached, the filter beds can be put back in service.

The Nichols U.S. Pat. Nos. 5,089,117 and 5,147,560 respectively disclose methods and apparatus for monitoring the operation of automatic backwash filters through turbidity measurement of effluent and halt movement of backwashing from one cell (bed) to a subsequent cell until the level of turbidity of effluent from the active cell has reached a required value. However, these methods and apparatus do not address the often occurring need to keep the automatic backwash filter in service even when one or more of the many cells therein do not operate in a manner to meet the contaminant content requirement. The present invention addressed this situation and provides devices and methods that permit operation of the automatic backwash filter to continue in spite of the presence therein of one or more problem cells.

OBJECTS

A principal object of the invention is the provision of improvements in automatic backwash filtering systems and methods.

A further object is the provision of new devices and methods for control of backwash operations in automatic backwash filtering systems.

Another object is the provision of new devices and methods that permit the Nichols automatic backwash methods and apparatus supra to continue to operate in spite of the presence therein of one or more cells that would terminate such operation in the absence of the improvements of this invention.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The invention is applied to known methods for cleansing a plurality of seriate filter cells by backwashing the cells one at a time by (a) withdrawing backwash liquid from an effluent channel common to seriate effluent ports of the plurality of filter cells, (b) pumping the backwash liquid seriatim through separate effluent ports of individual filter cells and (c) flowing filtered effluent from the each cell through its effluent port into the effluent channel, (d) simultaneous with the backwashing of a new cell in the plurality of filter cells, pumping waste liquid from the immediately previous backwashed cell through its effluent port, (e) monitoring such waste liquid for contaminant content, e.g., by turbidity or particle monitoring, (f) continuing the waste liquid pumping until the contaminant content thereof reaches a predetermined low level, (g) preventing the cleansing operation on the new cell from moving to a further cell until the contaminant content of the waste liquid from the previous backwashed cell reaches a predetermined low level, and (h) reapplying such combination of steps in the repeating of such cleansing operation through all the filter cells in the automatic backwash filter system.

The objects are accomplished in part in accordance with the invention by improving such known filter methods by addition of a unique combination of steps comprising determining the quantity of waste liquid pumped through the immediately previous backwashed cell waiting for the contaminant content of such waste liquid to reach a predetermined low level, overriding the prevention of the cleansing operation on the new cell from moving to the further cell before the determined quantity reaches a predetermined value thereby allowing the cleansing operation to pass to the further cell, and recording the identity of the previous backwashed cell that is defective.

In some embodiments of the invention, the contaminant content of the waste liquid is determined by measurement of its turbidity, while in others it is determined by particle counting, e.g., with an in-line particle monitor. Also, the determination of quantity of waste liquid can be by a fluid meter or a timer. Further, the new improvements may include in the combination of steps the additional step of issuing an alert signal that a defective cell has been overridden.

The invention also makes improvements in known filter cleansing systems that have (a) a filter tank divided into a plurality of seriate cells containing filter media, (b) influent means for delivering liquid to be filtered to the top of the filter media, (c) a separate port in each separate cell beneath its filter media for discharging liquid from and charging liquid thereto, (d) an effluent channel common to all the separate ports that all communicate with the effluent channel through a longitudinal planar surface in which the separate ports are substantially equally spaced apart a predetermined distance along a longitudinal axis, (e) backwashing means including a pump for forcing backwashing liquid through the separate ports one at a time to flow upwardly through the cell associated with the respective the port, (f) a backwash shoe that slides along the planar surface to access the separate ports, (g) motor means for sliding the backwash shoe along the planar surface, (h) the sliding surface of the backwash shoe that longitudinally moves along the planar surface in fluid tight contact therewith contains at least first and second spaced apart openings therein, (i) first conduit means connecting the backwashing means pump to the first opening, 0) a waste water pump, (k) second conduit means connecting the waste water pump to the second opening, (1) third conduit means for conveying liquid from the waste water pump to waste and (m) monitor means for monitoring the waste water being conveyed in the third conduit means.

The objects are also accomplished in part in accordance with the invention by improving such known filter systems with measuring means to determine the volume of waste water conveyed in said third conduit means, override means to actuate said motor means when said measuring means determines that a predetermined volume of waste water has been conveyed in said third conduit means and recording means to identify the cell that equalled or exceeded the predetermined volume of water.

In one embodiment of the new filter cleansing systems, the measuring means is a timer. In another embodiment, the measuring means is a fluid meter.

In preferred embodiments of filter systems of the invention, the backwash shoe has first, second and third spaced apart openings therein, the first opening is central and is connected to the aforesaid first conduit means and the second conduit means is connected to the second and third openings via a valve that permits only whichever of the second and third openings is downstream the direction of sliding of the backwash shoe to communicate with the second conduit means.

In another embodiment, the cell which fails to meet the contaminant content requirement within the allotted amount of time or waste water flow is allowed to continue to waste while backwashing is stopped and the failing cell is identified (marked). When the identified cell meets the contaminant content requirement, the backwash cycle is reactivated.

The new methods of the invention are useful in identifying cells that have a media leak since a major reason for continuing high contaminant content, e.g., high turbidity or high particle count, are media leaks.

BRIEF DESCRIPTION OF THE DRAWINGS

A more complete understanding of the invention can be obtained by reference to the accompanying drawings in which.

DESCRIPTION OF THE PREFERRED EMBODIMENTS

Figure 1:
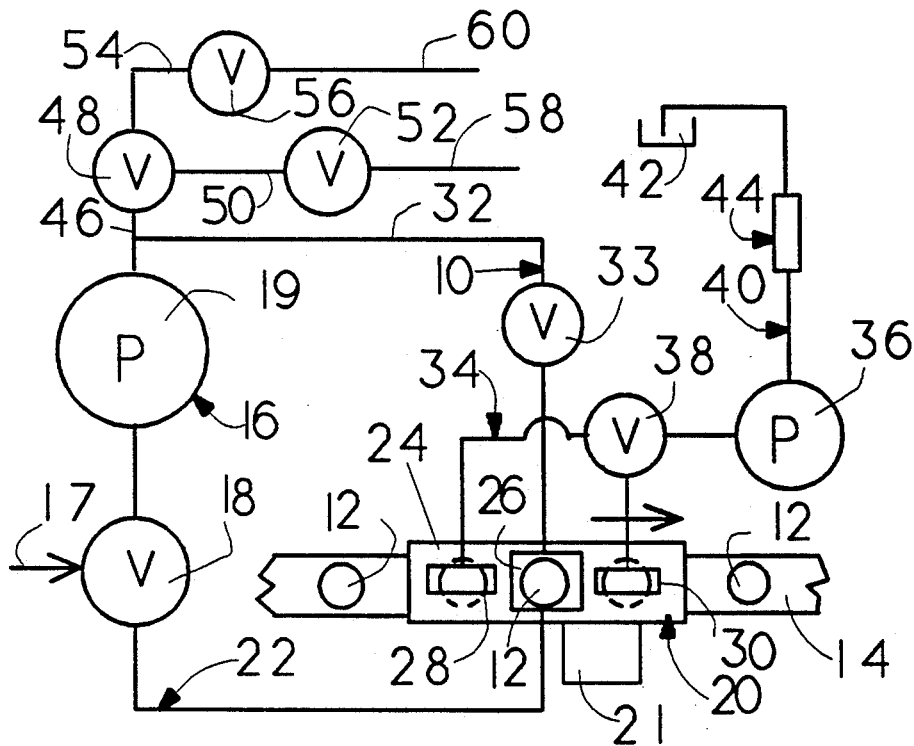
FIG. 1 is a schematic block diagram of contaminant content monitoring apparatus for automatic backwash filters of the prior art.

With reference in detail to FIG. 1 of the drawings, the cleansing system 10 which is a prior art system as disclosed in the aforesaid U.S. Pat. No. 5,089,117 that has a filter tank divided into a plurality of seriate cells containing filter media (not shown), influent means for delivering liquid to be filtered to the top of the filter media (not shown), separate ports 12 in each cell beneath its filter media for discharging liquid from and charging liquid to the respective the cell, an effluent channel (not shown) common to the plurality of the separate ports 12 that all communicate with the effluent channel through a longitudinal planar surface 14 in which the separate ports 12 are substantially equally spaced apart along a longitudinal axis, backwashing means 16 including an effluent conduit 17, a valve 18 and a pump 19 for forcing backwashing liquid through the separate ports 12 one at a time to flow upwardly through the cell associated with the respective the port, a backwash shoe 20 that slides along the planar surface 14 to access the separate ports 12, motor means 21 for sliding the backwash shoe 20 along the planar surface 14 and purging means 22 to remove liquid from the cells (not shown) via their respective ports 12 following backwashing.

The backwash shoe 20 has a sliding surface 24 for longitudinal movement along the planar surface 14 in fluid tight contact therewith. In preferred embodiments, the sliding surface 24 has at least first opening 26, second opening 28 and third opening 30. Alternatively, in other embodiments, one of the openings 28 or 30 may be omitted, but in such case, the shoe 20 can move in only one direction in performing a combined backwashing and turbidity monitoring operation.

A first conduit means 32 connects the backwash pump 18 via flow control valve 33 to the first opening 26.

A second conduit means 34 connects a waste water pump 36 to the second opening 28 and third opening 30 via a switch valve 38 that permits only whichever of the second and third openings is downstream the direction of sliding of the backwash shoe 20 to communicate with the second conduit means 34. For example, if the movement of the shoe 20 is in the direction of the arrow in FIG. 1, valve 38 would communicate opening 28 with pump 36 and blind opening 30.

A third conduit means 40 conveys liquid from the pump 36 to waste 42 and monitor means 44 monitors the waste water being conveyed in the conduit means 40.

The backwashing means 16 also includes by-pass line 46 and diverter valve 48 that connects via line 50 to adjustable flow valve 52 and via line 54 to adjustable flow valve 56. Egress line 58 from valve 52 discharges into the channel (not shown) from which effluent conduit 17 receives effluent to thereby enable a portion of liquid from pump 19 to commingle with potable water output. Egress line 60 from valve 56 connects to either waste (not shown) or to influent of a filter system for refiltering. The ratio of outputs through lines 58 and 60 is not important to the invention herein described.

In cleansing a plurality of seriate filter cells by backwashing the cells one at a time using the apparatus described above, backwash liquid from an effluent channel (not shown) common to seriate effluent ports 12 of the plurality of filter cells flows through conduit 17 and valve 18 to pump 19 and is pumped seriatim via conduit 32 and valve 33 through the separate effluent ports 12. The backwash sequence for each separate filter cell includes seven controlled phases of backwash, zero flow, purging and filtration, namely, 1) filtration rate, typically about 2 gals./min./sq.ft. filter area (gpm/sq.ft.), decreasing to zero, 2) zero flow, 3) increasing backwash rate, 4) full backwash rate, typically 20 gpm/sq.ft., 5) decreasing backwash rate, 6) zero flow and 7) purging.

In the purging phase, purging liquid is withdrawn from the backwashed filter cell via its port 12, line 22, valve 18 (switched to blind conduit 17), line 46, valve 48, line 54, valve 56 and line 60 to waste. It should be noted, during the backwash phase, backwash liquid moves upwardly through the filter cell while during the purging phase, purging liquid, which mainly consists of influent to the filter cell, moves downward through the filter cell and at a slower flow rate, e.g. 1/10th, than the flow rate of the backwash liquid.

Following such backwash sequence, the backwash shoe 20 will move to the next effluent port 12. Typical travel time for backwash shoe movement from one port to another will be about 20-30 seconds. Subsequent to the backwashing, filtered effluent flows from the each cell through its effluent port into the effluent channel and such steps of backwashing, purging and flowing filtered effluent on individual filter cells is repeated until all the filter cells in the system have been backwashed.

Simultaneous with the backwashing of a new cell in the plurality of filter cells, waste liquid is pumped by pump 36 from the immediately previous backwashed cell through its effluent port 12 and backwash shoe opening 28 (or 30 depending on shoe travel direction) to waste 42. While waste liquid flows to waste in conduit means 40, it is monitored for contaminant content by monitor means 44 and this waste liquid pumping and monitoring is continued until the contaminant content thereof reaches a predetermined low level. Until that level is reached, typically a turbidity of 0.25 NTU, the backwash shoe 20 is prevented from moving to a further cell. When the shoe 20 does move on, the combination of steps in the cleansing operation is repeated through all the filter cells in the automatic backwash filter system 10.

Figure 2:
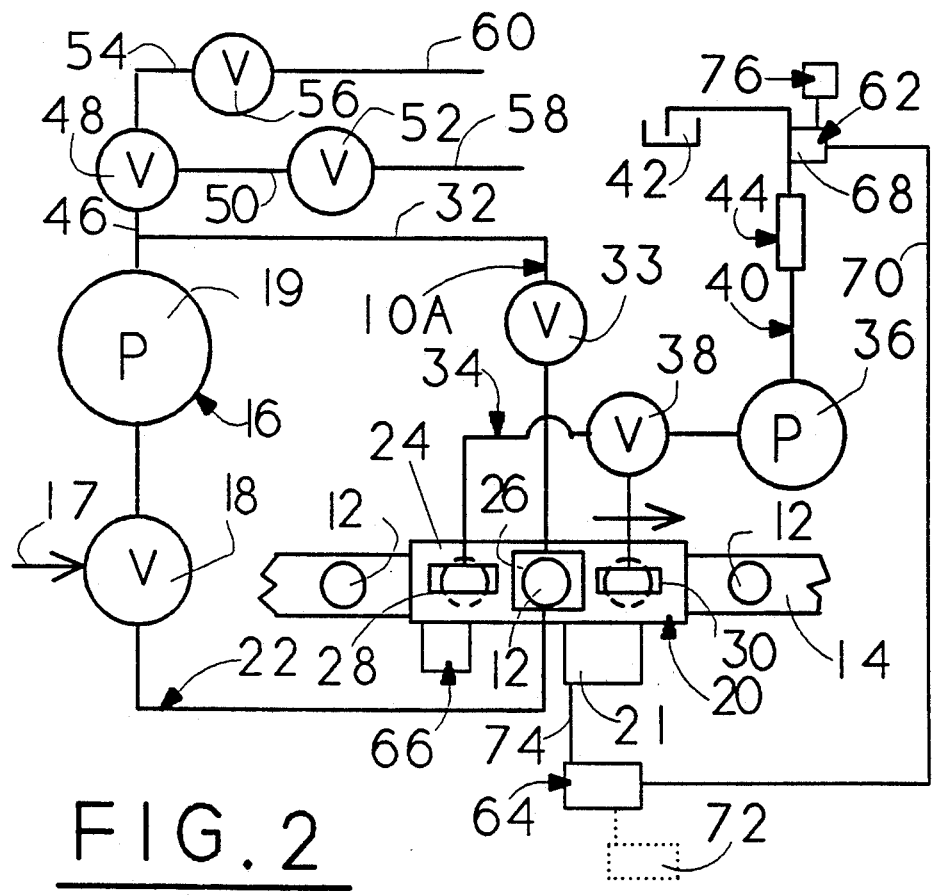
FIG. 2 is a schematic block diagram of a system of the invention for improvement of the operation of contaminant content monitored automatic backwash filters of the prior art.

With reference to FIG. 2, the cleansing system 10A in accordance with the invention improves the prior art system 10 supra by the addition of measuring means 62 to determine the volume of waste water conveyed in said third conduit means 40, override means 64 triggered by measuring means 62 to actuate said motor means 21 when measuring means 62 determines that a predetermined volume of waste water has been conveyed in third conduit means 40 and recording means 66 to identify the cell of system 10A at which override means 64 actuates motor means 21 to cause it to move shoe 20 to the next cell (not shown) to be subjected to a backwash cycle.

In one embodiment, the measuring means 62 is a fluid meter 68 that triggers override means 64 though line 70 when the predetermined volume of waste water has passed though conduit means 40. In another embodiment, the measuring means 62 is a timer 72 which is set to trigger means 64 after the passage of the time that a steady flow of waste water through conduit means 40 would equal the predetermined volume.

Typically, override means 64 is a solenoid switch to energize motor means 21 through line 74. Recording means 66 may be mechanical or electrical and, advantageously, is a programmable logic controller (PLC) (not shown), but can be a network of electro-mechanical relays (not shown), a computer (not shown), or a small flag on a spring loaded wire (not shown) that will pop up to record the cell that has equalled or exceeded the predetermined level of water.

Preferably, the system 10A will include signal means 76, e.g., a horn, bell, etc., to alert personnel to the fact that a cell in the system has been overridden in the backwash operation. Such signal means 76 may be energized either via the measuring means 62 or override means 64.

In operation of a system 10A of the invention, normally the movement of the shoe 20 from one cell to the next will be controlled by the turbidity monitor means 44. However, if a cell through which the predetermined volume of waste liquid has passed fails for some reason to meet the contaminant content requirement so the shoe 40 would be prevented from advancing in the prior art system 10, the measuring means 62 of system 10A takes control and enables the shoe 20 to advance. At the same time, recording means 66 identifies the defective cell so that corrective measures may be applied to it and, in some embodiments, an alert is also signalled by means 76.

I claim:

1. In a method of cleansing a plurality of seriate filter cells in an automatic backwash filter system that backwashes the cells one at a time by (a) pumping backwash liquid seriatim through separate effluent ports of individual filter cells, (b) simultaneous with the backwashing of a new cell in the plurality of filter cells, pumping waste liquid from an immediately previous backwashed cell through its effluent port, (c) monitoring such waste liquid for contaminant content, (d) continuing said waste liquid pumping from said immediately previous backwashed cell until the contaminant content thereof reaches a predetermined low level, (e) preventing the backwashing operation on said new cell from moving to a further cell until the contaminant content of the waste liquid from said immediately previous backwashed cell reaches a predetermined low level, and (f) reapplying such combination of steps in repeating such backwashing operation through all the filter cells in said automatic backwash filter system until all the filter cells in the system have been backwashed, the improvement which comprises in combination the steps of:

determining the quantity of waste liquid pumped from said immediately previous backwashed cell waiting for the contaminant content of said waste liquid therefrom to reach said predetermined low level, overriding the prevention of said backwashing operation on said new cell from moving to said further cell after said quantity of waste liquid reaches a predetermined value thereby allowing said backwashing operation to pass to said further cell, and recording the identity of said previous backwashed cell.

2. The method of claim 1 which includes the additional step of issuing an alert signal when said overriding step occurs.

3. In a method of cleansing a plurality of seriate filter cells in an automatic backwash filter system that backwashes the cells one at a time by (a) pumping backwash liquid seriatim through separate effluent ports of individual filter cells, (b) simultaneous with the backwashing of a new cell in the plurality of filter cells, pumping waste liquid from an immediately previous backwashed cell through its effluent port, (c) monitoring such waste liquid for turbidity, (d) continuing said waste liquid pumping from said immediately previous backwashed cell until the turbidity thereof reaches a predetermined low level, (e) preventing the backwashing operation on said new cell from moving to a further cell until the turbidity of the waste liquid from said immediately previous backwashed cell reaches a predetermined low level, and (f) reapplying such combination of steps in repeating such backwashing operation through all the filter cells in said automatic backwash filter system until all the filter cells in the system have been backwashed,
the improvement which comprises in combination the steps of:
measuring the time waste liquid is pumped from said immediately previous backwashed cell while waiting for the turbidity of said waste liquid therefrom to reach said predetermined low level,
overriding the prevention of said backwashing operation on said new cell from moving to said further cell after said measured time reaches a predetermined value thereby allowing said backwashing operation to pass to said further cell, and
recording the identity of said previous backwashed cell.

4. In a filter cleansing system having a filter tank divided into a plurality of seriate cells containing filter media, influent means for delivering liquid to be filtered to the top of said filter media, a separate port in each said filter cell beneath its said filter media for discharging liquid from and charging liquid to the respective said cell, an effluent channel common to the plurality of said separate ports that all communicate with said effluent channel through a longitudinal planar surface in which said separate ports are substantially equally spaced apart a predetermined distance along a longitudinal axis, backwashing means including a pump for forcing backwashing liquid through said separate ports one at a time to flow upwardly through said cell associated with the respective said port, a backwash shoe that slides along said planar surface to access said separate ports and motor means for sliding said backwash shoe along said planar surface, said backwash shoe comprising a sliding surface for longitudinal movement along said planar surface in fluid tight contact therewith, said sliding surface having at least first and second openings therein the centers of which are spaced apart about said predetermined distance, first conduit means connecting said backwashing means pump to said first opening, a waste water pump, second conduit means connecting said waste water pump to said second opening, third conduit means for conveying liquid from said waste water pump to waste and monitor means for monitoring contaminant content of said waste water being conveyed in said third conduit means, the improvement which comprises:
measuring means to determine the volume of waste water conveyed in said third conduit means,
override means to actuate said motor means when said measuring means determines that a predetermined volume of waste water has been conveyed in said third conduit means, and
recording means to identify the cell of said system which caused said override means to actuate said motor means.

5. The filter cleansing system of claim 4 wherein said measuring means is a timer.

6. The filter cleansing system of claim 4 wherein said measuring means is a fluid meter.

7. The filter cleansing system of claim 4 wherein said monitor means is a turbidity meter.

8. The filter cleansing system of claim 4 wherein said monitor means is a particle counter.

9. The system of claim 4 wherein said backwash shoe has first, second and third openings, said first opening is central and is connected to said first conduit means and said second conduit means is connected to said second and third openings via a valve that permits only whichever of said second and third openings is downstream the direction of sliding of said backwash shoe to communicate with said second conduit means.

10. The system of claim 4 wherein said motor means is capable of sliding said backwash shoe both from left to right and right to left along said planar surface.

* * * * *